United States Patent [19]
Erisman

[11] 3,799,308
[45] Mar. 26, 1974

[54] TRANSMISSION CLUTCHES WITH FEEDBACK CONTROLLED PRESSURE MODULATOR

[75] Inventor: Edward R. Erisman, Oak Park, Ill.

[73] Assignee: International Harvester Company, Chicago, Ill.

[22] Filed: Oct. 20, 1972

[21] Appl. No.: 299,523

[52] U.S. Cl.......... 192/87.13, 192/3.57, 192/109 F, 91/413, 60/445
[51] Int. Cl............................................. F16d 25/10
[58] Field of Search............ 192/3.57, 109 F, 87.13, 192/87.18, 87.19; 74/740

[56] References Cited
UNITED STATES PATENTS

| | | | |
|---|---|---|---|
| 3,566,716 | 3/1971 | Chatterjea | 192/109 F |
| 2,721,640 | 10/1955 | Feo et al. | 192/109 F |
| 3,583,422 | 6/1971 | Dach | 192/109 F |
| 3,389,770 | 6/1968 | Golan et al. | 192/109 F |
| 3,468,194 | 9/1969 | Horsch et al. | 192/109 F |
| 3,707,891 | 1/1973 | Asano | 192/109 F |

Primary Examiner—Benjamin W. Wyche
Attorney, Agent, or Firm—John W. Gaines; Floyd B. Harman

[57] ABSTRACT

Hydraulic mechanism in a transmission for engaging a clutch for first, second, or third speed before a clutch for the F-R, or forward or reverse, direction. Flow of pressure fluid to each speed clutch and to each direction clutch is by way of a scheduling valve which is back-pressure-operated in controlled way for throttling the flow. Back pressure originates in a sensing line from the power unit of each speed and direction clutch, and the different lines are differently orificed. After the power unit for the clutch for first, second, or third speed and the power unit for the F-R clutches are pre-filled with fluid, pressure in the power units is then slowly raised linearly toward its maximum, the slowness of rate depending upon the smallness of the orifice in each sensing line affected. The speed clutches are constructed, proportioned in size, and arranged to have smaller energy absorbing capacity in their design and they operate so as to be fully hydraulically engaged at a slightly lower pressure than, and hence slightly before, the F-R clutches.

11 Claims, 6 Drawing Figures

TRANSMISSION CLUTCHES WITH FEEDBACK CONTROLLED PRESSURE MODULATOR

This invention relates to the control of hydraulic fluid for operating the power units for the clutches of an automotive transmission. More specifically, the invention relates to schedules actuation of power units for clutches in a sequence in a power shift transmission of a tractor.

It is desirable in the operation of a tractor to set a control both for direction and for speed at the same time, and thereafter automatically control the clutches for forward and reverse from the same hydraulic circuit as the clutches for first, second, and third speed. Yet, in one example hereinafter given, the speed clutch should be fully engaged before the direction clutch, all while the tractor engine continues undisturbed at its operating speed, and the direction clutch should then undergo engagement while the tractor engine still continues at the operating speed.

A novel scheduling valve is provided herein which affords different pressure rise rates depending upon what signal pressure is applied in the transmission during scheduling. Such valve, according to my invention, more specifically schedules pressure in the direction or F-R clutches of the tractor at different rates, depending not only upon the direction selected but also upon whether first, second, or third gear is selected.

Various features, objects, and advantages will either be specifically pointed out or become apparent when, for a better understanding of the invention, reference is made to the following description taken in conjunction with the accompanying drawings, which show a preferred embodiment thereof and in which:

To prepare the reader for the description to follow, I herewith set out some observations on a power shift tractor transmission which is somewhat typical, and the characteristics of which are given only for a more ready understanding of the invention and not by way of limitation. Among the power transmission paths through a three-speed tractor transmission, for example, the least torque multiplication occurs in the third speed path, inherently accommodating in that path to a comparatively soft shift while the tractor engine is running at operating speed. But there is more torque multiplication in the second speed path, and high torque multiplicaton in the first speed path with the result that a sudden shift into first speed while the engine continues at operating speed can give the tractor a jerk in its movement despite its high inertia.

Recognition of those characteristics by me has dictated that my scheduling valve assembly, in the illustrative transmission, schedule the linear rates of pressure rise so as to be progressively slower at respective third, second, and first speeds, and to be even slower in the forward or F speed range because the highest torque multiplication paths are through the F range as compared with reverse or R paths through the transmission. The practical importance of such scheduling is that consistent soft shifts will occur at full engine operating speed despite the fact that the shift lever handle is moved directly from an existing speed in one range to a selected speed in the opposite range and immediately let go by the driver.

Figure 1:
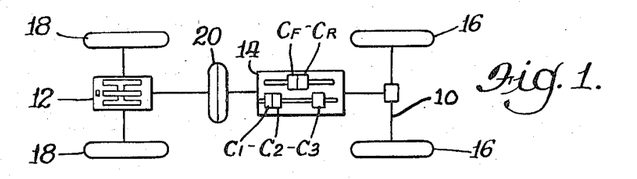
FIG. 1 is a diagrammatic showing in plan of a tractor having a power shift hydraulic transmission embodying the present invention.

More particularly in FIG. 1 of the drawings, a tractor 10 is shown having a front engine 12 and a transmission 14 coupling the engine to a pair of rear traction members 16. The latter members 16 can carry rubber tires or sprocket teeth depending upon the type tractor. The counterpart members 18 at the front can be front idlers or be engine driven, and be steerable or not depending upon the traction mechanism in the type tractor involved.

The transmission 14 in the illustrative example is a three-speed transmission receiving amplified torque from the engine through a torque converter 20 and providing plural power paths through conventional reduction gearing in the transmission. Power shifting of the transmission 14 is accomplished by a single hand lever, not shown, and by a power pack controlled thereby comprising large energy dissipating, direction clutches $C_F$–$C_R$ which selectively engage in either the three-speed forward range of the three-speed reverse range in the transmission. Cooperating for that purpose with the large direction clutches is a group of three speed clutches designated $C_1$–$C_2$–$C_3$ which selectively establish an appropriate gear reduction path desired in the direction selected.

Figure 2:
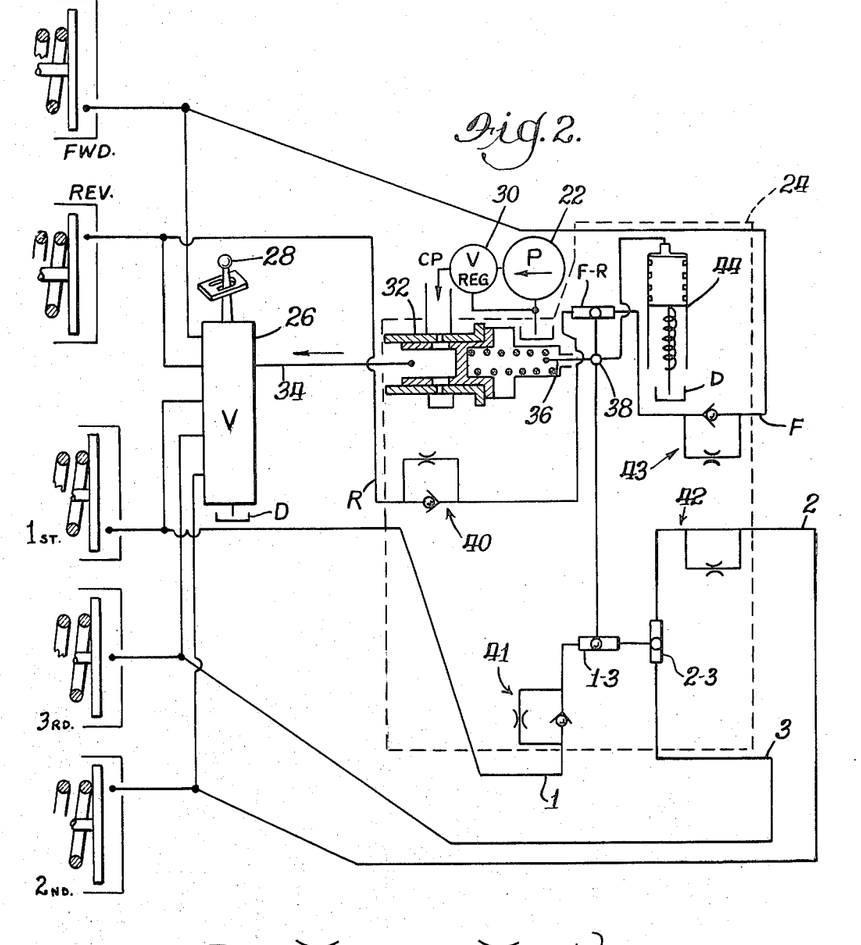
FIG. 2 is a schematic showing of the power shift hydraulic transmission, including a scheduling valve assembly.

The clutches referred to are fluid operated by hydraulic cylinders designated in FIG. 2 as FWD, REV, first, second, and third. The speed clutches are constructed, proportioned in size, and arranged with smaller energy absorbing capacity than either of the larger $C_F$ or $C_R$ clutches. Each of the clutch cylinders first, second, and third and its individual opposing spring means, not shown, is constructed, proportioned, and arranged to insure that each receives clutch engaging pressure at a pressure lower than for the direction clutch cylinders and, perforce, the selected one of the speed clutch cylinders operates the speed clutch before the clutch $C_F$ or $C_R$ for forward or reverse direction. The speed clutches $C_1$, $C_2$, and $C_3$ encounter only comparitively minor energy absorbing load in the power train at the time at which the selected one thereof engages. Only one direction clutch and only one speed clutch engage for a given tractor drive speed and direction.

In FIG. 2, a high pressure pump 22 draws from a reservoir source is seen to supply oil or other hydraulic fluid in a path leading through a scheduling valve assembly 24, through a transmission selector valve 26, and thence into a selected one of the FWD or REV clutch cylinders and also into a selected one of the first, second, or third speed clutch cylinders. Each cylinder is controlled by hydraulic pressure and by a spring to engage and disengage, respectively, the clutch concerned. The transmission selector valve 26 is manually controlled by an operator's shift lever handle 28 which is set for both direction and speed at the same time, whereafter the transmission is automatically scheduled and engaged with proper delay. The valve 26 is thus made effective to supply high pressure from the pump 22 or the low pressure of a drain source D, depending upon whether the selected clutch cylinder is being pressurized or exhausted.

More specifically, fluid from the pump 22 flows through a regulator 30 having output of constant pressure CP, into a throttle poppet valve 32 which is in the assembly 24 and which is connected by a charging line 34 to the selector valve 26 for charging the clutch cylinders. The valve 32 responds to pressure signals from a signaling line 36 connected to a sensitive valve area and communicating thereto signals developed in a manner to be described.

SIGNALS — FIG. 2

Feedback lines 1, 2, 3, F, and R are tapped into different ones of the individual lines which are connected between the transmission selector valve 26 and each of the clutch cylinders and through which high and low pressures are supplied to the latter. Feedback signals selectively from the forward or from the reverse clutch cylinder are communicated to the sensitive area of the valve 32 in a path leading through a shuttle valve F-R connected to the R feedback line and the F feedback line, thence through a juncture 38, and into the signaling line 36. Feedback signals selectively from the second and from the third clutch cylinder are communicated to the sensitive area of the valve 32 in a path leading through a shuttle valve 2-3 connected to the feedback line 3 ane the feedback line 2, through a shuttle valve 1-3, thence through the junction 38, and into the signaling line 36. Feedback signals from the first clutch are communicated, whenever there is no signal from the second or third clutch, in a path leading through the shuttle valve 1-3 connected to feedback line 1 and shuttle valve 2-3, thence through the juncture 38 and into the signaling line 36.

Pressure of the resulting signals is controlled by a restrictive structure 40 in line R, a restrictive structure 41 in line 1, a restrictive structure 42 in line 2, and a restrictive structure 43 in line F, and by an accumulator 44 having a drain D. The resulting resistance-capacity network affords linear rates of signal pressure rise in known way in the circuit, depending upon the relative proportions of the restrictions and accumulator and the matching of their flow rates and pre-loaded capacity.

Figure 3:
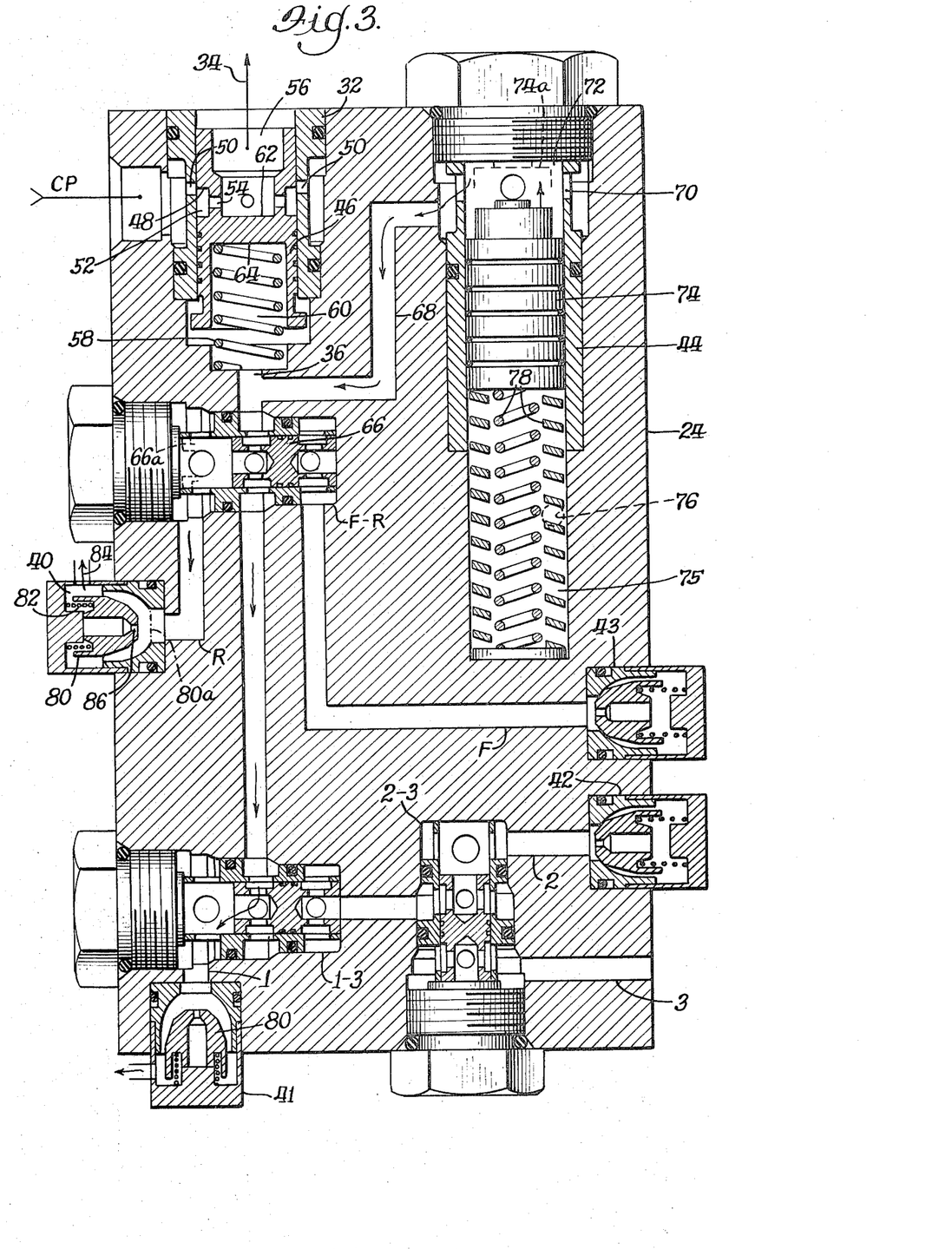
FIGS. 3, 4, and 5 are schematic showings of the scheduling valve assembly in different operating adjustments.

THROTTLE POPPET 32 — FIG. 3

A valve spool 46, having a transverse wall and being longitudinally slidably mounted in the bore of throttle poppet 32, at all times blocks the pressure of charging line 34 from ever reaching the signalling line 36. The regulating edge of an intermediate shoulder 48 on the spool 46 adjustably controls the opening of a set of radial ports 50 covered thereby and leading pressure CP from the high pressure source. Fluid thus controlled flows in a path leading from the ports 50, past the shoulder 48, through an adjoining annular groove 52 on the spool 46, and a set of radial ports 54 in the spool, thence through a charging pressure chamber 56 in the spool to the charging line 34.

A valve opening compression spring 58 in the bore has an end received in a spring chamber 60 in the spool and thrusting longitudinally against the base of the chamber in a valve opening direction. The spring chamber 60 communicates through the valve bore with the signalling line 36.

The spool 46 has a charge pressure movable area indicated by the general designation 62 which is subject to clutch charging pressure acting in a self-limiting direction to overcome the spring 58 and close the valve. An opposite sensitive valve area indicated by the general reference numeral 64 functions as a spring augmenting pressure movable area on the spool which, as and when subject to pressure equal to the charging pressure, renders the spool dynamically unstable and allows the spring 58 to expand and fully open the valve.

SHUTTLE VALVES — FIG. 3

The valve F-R is typical of the shuttle valves. A valve spool 66, having a transverse wall and being longitudinally slidable in a bore in the valve, at all times blocks pressure in either of the opposite ends of the valve from the other end. In the example of shuttle valve F-R, the feedback line R at one end is prevented from communicating with the feedback line F at the opposite end of the valve bore, and vice versa.

The spool 66 is dynamically unstable, taking either the solid line position shown or an opposite position indicated by the broken lines 66a. Specifically, when shuttled into the solid line position as brought about by pressure in the feedback line R, the spool 66 intercommunicates the feedback line R and an accumulator inlet-outlet line 68 which serves the accumulator 44. When shuttled into the broken line position 66a due to pressure in the feedback line F, the spool intercommunicates the feedback line F and the accumulator inlet-outlet line 68.

Shuttle valves take many forms, and the form illustrated is in general use. Hence, the details and specific operation are known in the art and will be omitted.

ACCUMULATOR 44 — FIG. 3

With each gear change of the transmission, the accumulator 44 undergoes a full cycle of operation wherein it empties and is then replenished with a charge of the hydraulic fluid. The working pressure on the accumulator between such cycles is approximately 250 PSI in one physically constructed embodiment of the invention.

Such pressure, incoming through the inlet-outlet line 68, passes through radial ports 70 in the bore of the accumulator 44 and accumulates therein in an accumulator chamber 72 at one end of the bore. A longitudinally slidable piston 74 in the bore divides the latter into the chamber 72 and a spring chamber 75 which is vented at 76. Concentric pre-loading springs 78 in the chamber 75 thrust longitudinally at one end against the piston 74 and stop the latter when the piston 74 has moved downwardly to a point at which the hydraulic force of fluid pressure in chamber 72 is mechanically balanced by the combined compression force of the springs 78.

The piston 74 is dynamically unstable when the accumulator chamber pressure is released from chamber 72, and the piston 74 takes the bottomed broken line position 74a due to full expansion of the springs 78.

FLOW-CHECK VALVES — FIG. 3

A longitudinally shiftable flow-check valve element 80 is arranged in the restrictive structure 40, and the arrangement is typical for the several other restrictive structures 41, 42, and 43. The flow-check element 80 which is biased by a check valve spring 82 toward a broken line seated position indicated by the broken lines 80a, renders the restrictive structure 40 an orifice-type check valve for providing unrestricted flow in the direction of an adjacent arrow 84 and a restricted flow in the direction opposite to the direction of the arrow 84.

More specifically, a longitudinal restriction 86 in the element 80 is ineffective when the element 80 is in the solid line unseated position as shown by solid lines in FIG. 3, and hence the accumulator 44 is freely connected to low pressure and can empty immediately. But in the broken line seated position of the valve element as shown by the broken lines 80a, the restriction 86 is effective to pass only a tiny flow of fluid from the feedback line R into the accumulator 44. So the accumulator is replenished comparatively slowly with fluid at the reduced pressure caused by the pressure drop across the orifice.

A SHIFT FOLLOWING REVERSE DRIVE IN FIRST GEAR — FIG. 3

At the time at which the transmission is to be shifted from any drive condition, for example from reverse drive in first gear, the active lines in the scheduling valve assembly 24 will be the reverse feedback line R and the first feedback line 1, which will have caused the spool 66 of shuttle valve F-R to be in the rightward position as shown in solid lines and the spool of shuttle valve 1-3 to be in the rightward solid line position. Thus the shuttle valve F-R will have isolated the forward feedback line F from the circuit and the shuttle valve 1-3 will have isolated the feedback lines 2 and 3 from the circuit. Also, the shuttle valve 2-3 is shown in its downward position, even further isolating the feedback line 3 from the circuit.

FIG. 3 illustrates the relationship of parts at the first instant following movement of the control lever from the first gear position in reverse drive to the second gear position in forward drive. The accumulator 44 dumps through the check valves associated with the clutches which become disengaged during the shift. Incidentally it so happens however that the charge in the accumulator 44 is emptied each time there is a shift of any nature.

Pressure is dropped instantaneously and simultaneously in all active circuits including the operative REV and first clutch cylinders, not shown, and perforce in the operative feedback lines R and 1 which continuously sense the pressure in those two clutch cylinders. Consequently, the flow-check valve elements 80 in the restrictive structures 40 and 41 take the unseated solid line positions shown and freely allow the accumulator springs 78 to move the accumulator piston 74 in the direction of the arrow thereon so as to reach the fully emptied position shown by the broken lines 74a. All clutches in the transmission, not shown, are at this time fully disengaged. Full line pressure CP is present, e.g., 250 PSI.

Figure 4:
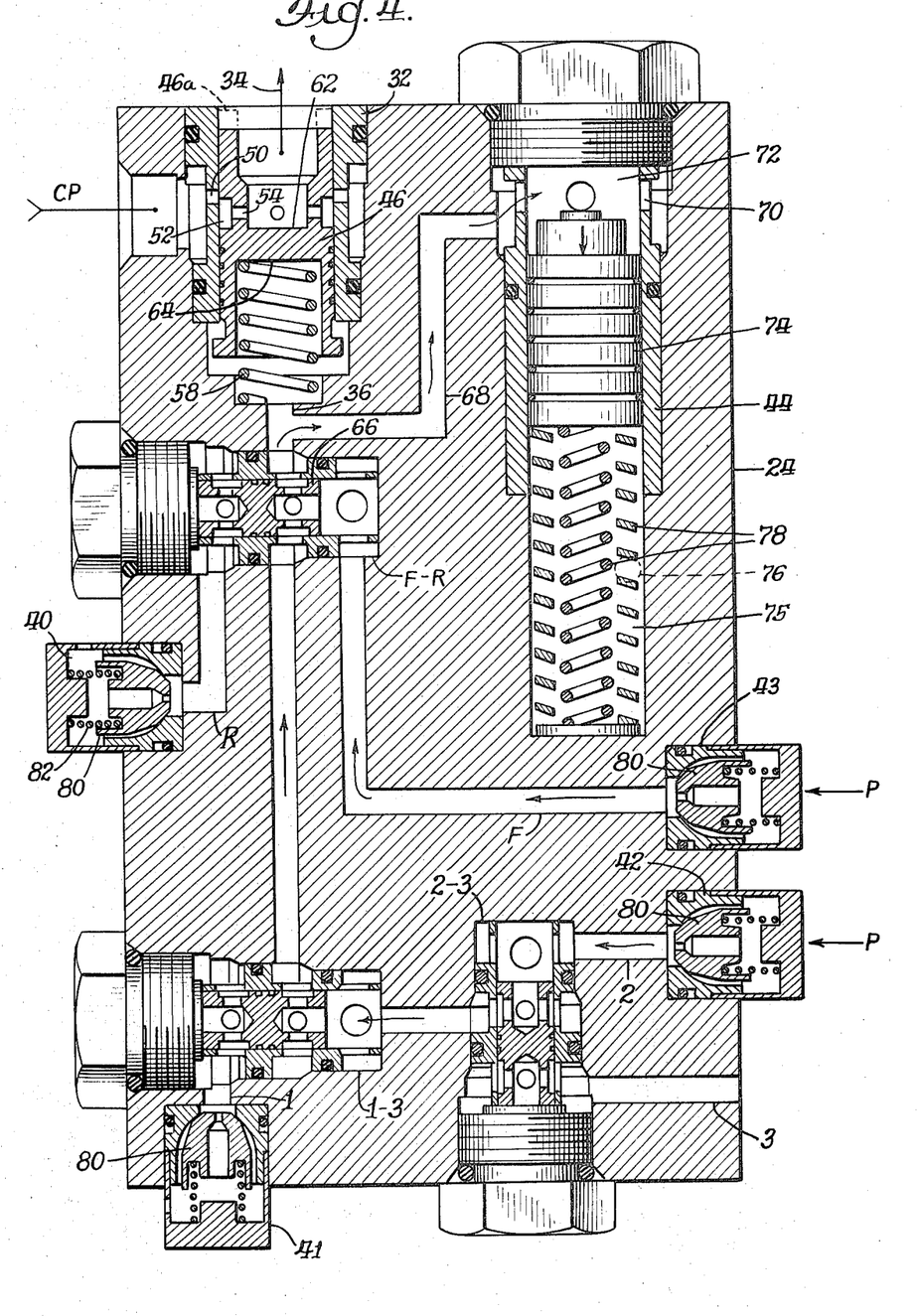

CLUTCH FILL IN SECOND GEAR FORWARD DRIVE — FIG. 4

Movement of the shift lever, not shown, into any position, for example into position corresponding to forward drive in second gear, can be made from the previously discussed position, or from neutral, or any other position. At the time, pressure is drained from the clutch cylinders FWD and second and is at a low or zero value. Hence the respective areas 62 and 64 at both the front and the back of the throttling valve spool 46 "feel" the reduced pressure and have no appreciable effect on the position of the spool. So the unopposed valve opening spring 58 initially expands to its limit of travel, moving the spool into the open broken line position as shown by the broken lines 46a and perforce opening the clutch charging line 34 to line pressure at the constant value CP. Then regulation by throttling begins.

The opening spring 58 in one physically constructed embodiment of the invention had a throttling value equivalent to 30 PSI, and hence caused the clutches to be filled under 30 PSI charging pressure which the spool felt on the charge-pressure-movable area 62 and responded to by taking a partly closed dynamically balanced position.

CLUTCH ENGAGING PRESSURE — FIG. 4

Without interruption following the clutch filling operation, flow in the charging line 34 continues with a gradual buildup of clutch pressure linearly until, first, the second clutch cylinder engages the second clutch and, second the FWD clutch cylinder engages the forward clutch CF, not shown. Such gradual buildup comes from various actions and reactions at points in the circuit.

More particularly at the point when the clutch cylinder pressure begins to rise above 30 PSI, the internal pressures P at restrictive structure 43 and P at restrictive structure 42 have the same values and rate of rise so that the two flow check elements 80 concerned cause a tiny flow in each of the feedback lines F and 2. Consequently, the spool 66 in shuttle valve F-R and the spool in the shuttle valve 1-3 are shifted under fluid pressure to the respective solid line leftward positions shown in solid lines in FIG. 4, and the two tiny flows as first and second signals combine and together enter the inlet-outlet line 68 of the accumulator 44. The resulting accumulator scheduling pressure consequently forces the accumulator piston 74 gradually downwardly against the resistance of the two springs 78, and the accumulator scheduling pressure rises linearly.

As the accumulator pressure increases, the increase is felt on the sensitive area 64 or back of the poppet spool so as to raise the spool 46 slightly upwardly as viewed in FIG. 4 and cause the clutch pressure to increase. And at the point at which the accumulator piston 74 has moved in the direction of the arrow to the design position for 250 PSI, the hydraulic pressures on the poppet spool areas 62 and 64 will have equalized. At that point, the forward clutch cylinder FWD will have caused the forward clutch CF to engage and slightly theretofore, the second clutch cylinder will have caused the second clutch $C_2$, not shown, to engage. None of the speed clutches $C_1$, $C_2$, $C_3$ has enough clutch area, cooling capacity, and power rating to be suited for the heavy work of being the final clutch to engage in the power train.

Figure 5:
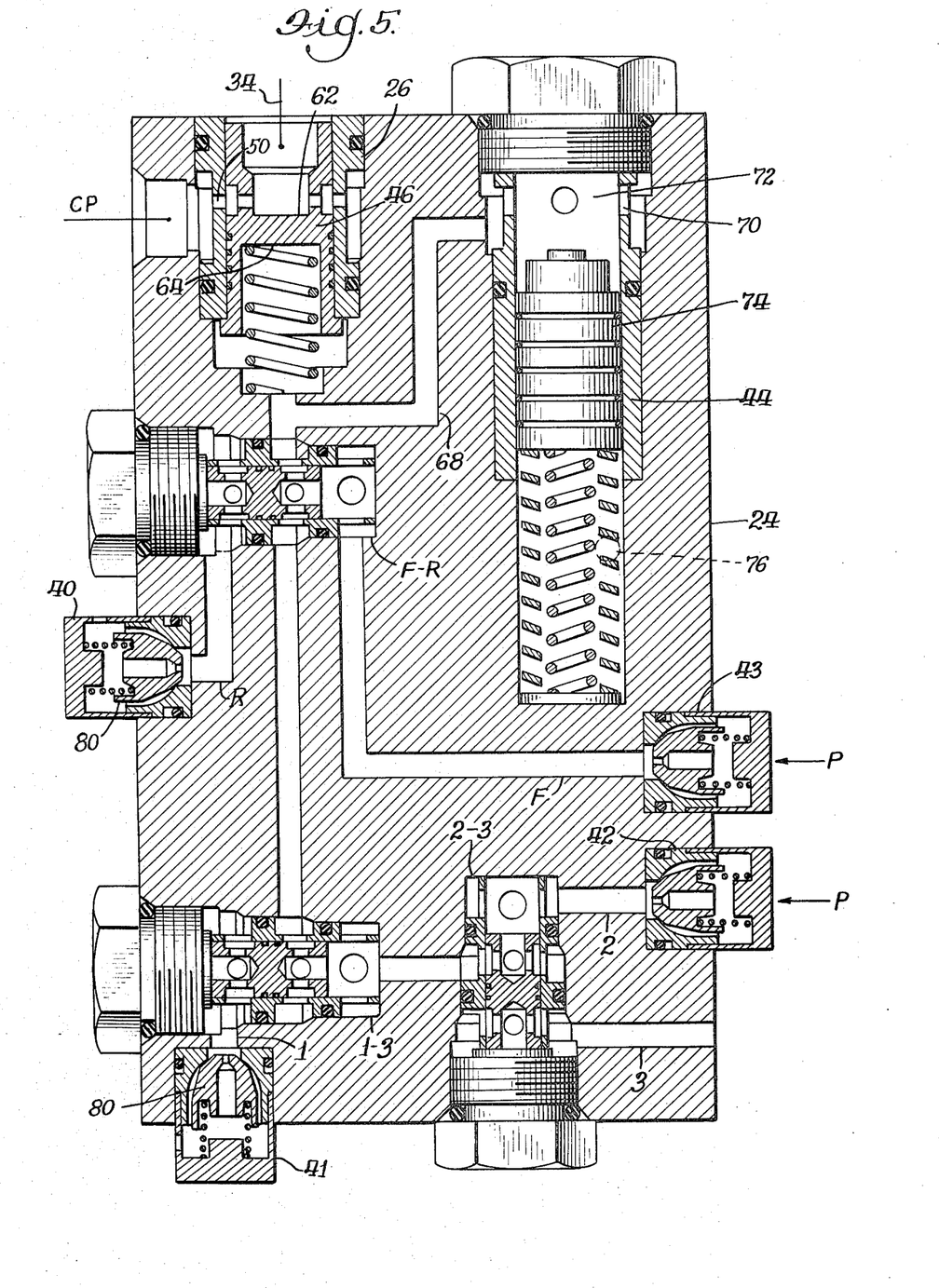

DRIVING IN SECOND GEAR, FORWARDLY — FIG. 5

Specifically upon pressure equalization, the pressure at the area 62 and area 64 equals the pressure of the source having the constant value CP, and the pressure P in restrictive structure 43 and the pressure P in restrictive structure 42 have the same CP value. The throttle spool 46 takes the solid line fully opened position as shown in solid lines in FIG. 5, and the piston 74 of the accumulator 44 takes the maximum design position as shown in solid lines in FIG. 5.

Upon the next movement of the shift lever, not shown, the cycle is repeated and the accumulator replenishment cycle is repeated as before. The results of any such movement are believed apparent from the foregoing, as to third speed reverse, for example, and further description is omitted for the sake of brevity.

ILLUSTRATIVE TABLE

Following is an example of a table of speed changes consistent with my observations given at the outset:
  Make the comparatively fastest change into third speed reverse.
  Make a fast change into third speed forward
  Make a fast change into second speed reverse
  Make a slow change into second speed forward
  Make a slow change into first speed reverse
  Make the comparatively slowest change into first speed forward My scheduling valve assembly always utilizes two of the restrictive structures in combination, and so there are two flows simultaneously during each filling of the accumulator during a replenishing cycle. Therefore, by combinations possible, any reasonable table can be complied with in use of my valve, such as the foregoing example as will now be apparent.

Figure 6:
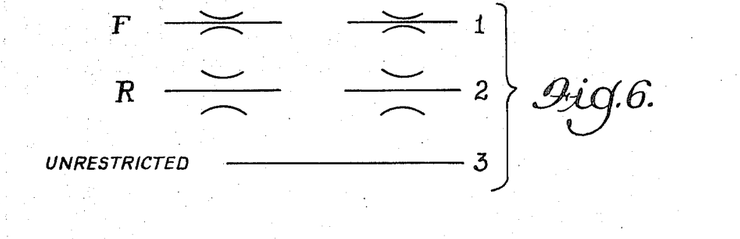
FIG. 6 is a diagrammatic showing in cross section of various orifices employed in the scheduling valve assembly.

RELATIVE RESTRICTION SIZES — FIG. 6

FIG. 6 illustrates the proportions of the orifices 86, not shown, of the flow-check valve elements present in the various feedback lines. The typical size of one restriction employed is a physically constructed embodiment of the invention was 0.041 inch inside diameter, and the other restrictions were of that order, more or less. The feedback lines R and 2 are seen to be restricted, the feedback lines F and 1 are seen individually to be more restricted, and the feedback line 3 can be seen to be unrestricted.

It follows, therefore, that filling of the accumulator will be at the slowest rate when the shift lever is set in forward drive for first gear. At the other extreme, the most rapid linear rate of rise of pressure in the accumulator will occur when the shift lever is set in reverse drive for third speed. It will be appreciated that the feedback line 3 can be provided with some slight restriction, although no restriction has been found necessary or desirable in applications of the invention so far considered. Many other combinations will be apparent to the reader.

As previously indicated, the reason a transmission in accordance with my invention will be immediately neutralized when the shift lever is moved out of any operating position is that the selector valve 26, FIG. 2, connects all active circuits simultaneously and immediately to drain pressure, including the two clutch cylinders concerned and the two feedback lines concerned. So the fluid pressures which obtained at points at 250 PSI drop to drain pressure, and the pressures already at drain pressure remain at drain pressure.

Subsequent positioning of the shift lever handle 28 into an operating position, FIG. 2, will schedule an operation marked by two consecutive events following automatically. First, the shortest event will be the low, constant pressure, clutch filling, terminating at the transition point marking the second event when the pressure starts its linear rise. The rate of linear rise will be different but constant depending upon which signal pressures are being applied to the accumulator 44, FIG. 2. Gradual build up of clutch pressure in this way follows from the fact that as the reduced feed back pressure on the throttling poppet increases, so does the clutch pressure increase.

The second event will terminate during the pressure rate of rise in the clutch cylinders at the point at which the clutch pressure reaches its maximum value. Early during the linear pressure rise, the small, speed clutch fully engages. Much later, the selected one of the F-R clutches engages, after absorbing the high energy encountered during the shift.

Upon engagement of the selected F-R clutch, the power path is completed in the transmission 14, FIG. 1, whereupon the tractor 10 will proceed under drive of the engine 10 in the proper direction in the gear drive selected.

As herein disclosed, a single engine and single transmission are shown to drive a vehicle with two wheel drive or four wheel drive, among other drives herein suggested. It is evident that in multi-engine multi-transmission vehicles wherein each engine-transmission combination drives at least two wheels, each of the transmissions in the vehicle can be equipped with an individual scheduling valve assembly, operating independently of the others, or all transmissions can share a single valve assembly.

My invention will be seen to provide a novel combination of steps in the operation of a reversible, power shift transmission having sets of direction and speed range clutch mechanisms, a final line pressure source for providing actuating pressure for the mechanisms, clutch selector means, and line pressure intercommunication operatively disposed between the final line pressure source and clutch selector means and controllable to operatively open and supply said mechanisms with actuating pressure through the clutch selector means. Such steps schedule the operation of the clutches in dependence upon signal pressures for the scheduled pressure and comprise: development of a first signal in a restrictive feedback circuit from the selected speed clutch mechanism; development of a second signal in a restrictive feedback circuit from the selected direction clutch mechanism; application of the first and second signals as a combined back pressure signal to an accumulator so that the latter accumulates the back pressure linearly and proportionately to the two signals jointly; controlling the opening of said line pressure intercommunication so as to control the pressure therein as a function of the linear rate of rise of said back pressure in the accumulator; effecting engagement of the selected speed clutch mechanism at less than final pressure; and effecting engagement of the selected direction clutch mechanism upon attainment of final pressure in said line pressure intercommunication.

What is claimed is:

1. In a control system for a reversible, power shift transmission having sets of direction and range clutches, and clutch cylinder means individual thereto and operable under a pressure rate-of-rise to clutch engaging pressure for changing speeds and direction of drive:

a source (22) of clutch charging fluid, under pressure;

clutch selector means (28) for operation of selected ones of the clutch cylinder means among said sets of clutch cylinder means, and having a line from the fluid source from which the fluid is supplied by the selector means to the cylinder means so selected;

a charging valve (32) connected in said line and controlled by a charge-pressure-movable area for closure of, and by a spring for the opening of, the valve, said spring being relatively weak and singly able to overcome no more than a predetermined low filling pressure exerted on the pressure movable area, by only part way opening the valve for causing flow under restricted pressure;

an accumulator (44) having communication to a spring-augmenting pressure-movable-area on the valve so as to open the valve toward full opening at full pressure, the accumulator due to its volume controlling the pressure rate-of-rise of fluid fed into said communication;

feedback lines individual to the clutch cylinder means and responsive to the clutch cylinder pressure thereof; and means selectively interconnecting feedback lines of only the cylinder means selected and said communication so that the spring augmenting pressure area proportionally aids in biasing the valve toward full opening at full pressure, as pressure in the selected clutch means and associated feed back lines increases toward clutch engaging pressure.

2. In a control system for a reversible, power shift transmission having sets of direction and speed range clutches, and clutch cylinder means individual thereto and operable for causing said clutches to change speeds and direction of drive:

a source of clutch charging fluid, under pressure of the order of clutch engaging pressure;

clutch selector means for operation of selected ones of the clutch cylinder means among said sets of clutch cylinder means;

an intercommunication which is operatively disposed between the fluid source and clutch selector means and which is controllable to operatively open and supply clutch cylinder fluid through the clutch selector means;

a fluid accumulator which, when cyclically replenished with another fluid charge during a change in transmission setting, accumulates back pressure proportionally;

feedback means individual to the clutch cylinder means and responsive to the clutch cylinder pressure thereof;

means selectively connecting feedback means of only the cylinder means selected and said accumulator and transmitting a pressure rate-of-rise into the accumulator; and control means in the intercommunication responsive to pressure rate-of-rise in said accumulator for progressively opening the intercommunication ultimately to supply the pressure fluid at substantially undiminished pressure.

3. The invention of claim 2 and:

means providing restrictions in the feedback means, a plurality of which feedback means differ from the others in magnitude of their restriction-to-flow to the accumulator, to more greatly slow the accumulator pressure rate-of-rise and, perforce, the pressure rate-of-rise in the clutch cylinder means selected.

4. The invention of claim 3, in combination with the clutch cylinder means of which a forward one is for a forward clutch in the set of direction clutches and a first one is for a first speed clutch in the set of range clutches;

a restriction of smallness affording the greatest magnitude of restriction-to-flow being in the feedback means from at least one of the just said ones of the clutch cylinder means.

5. The invention of claim 4:

the feedback selective-connecting means comprising a shuttle valve common to the respective feedback means from said forward clutch cylinder and from a reverse clutch cylinder for a reverse clutch in the set of direction clutches, and automatically opening under feedback pressure in the feedback means from the selected one of the forward and reverse clutch cylinders to intercommunicate such feedback means and the accumulator and cause a pressure rate-of-rise;

a second shuttle valve common to the respective feedback means from a second clutch cylinder for a second speed clutch in the set of range clutches and from a third clutch cylinder for a third speed clutch in the set of range clutches, and automatically opening an outlet under feedback pressure in the feedback means from the selected one of the second and third clutch cylinders; and a third shuttle valve common to the respective feedback means from said first clutch cylinder and from said second shuttle valve outlet, and automatically opening under feedback pressure in the feedback means from the clutch cylinder selected among first, second, and third clutch cylinders, to intercommunicate such feedback means and accumulator and cause a pressure rate-of-rise.

6. The invention of claim 5:

said restriction providing means comprising orifice-type check valves affording restricted flow in a first direction charging fluid into the accumulator and affording relatively unrestricted flow in the opposite direction for cyclically emptying the accumulator.

7. The invention of claim 6, wherein restrictions are provided in a plurality but not all of the feedback means, whereby certain of the accumulator's charging-and-emptying flow is utilized relatively unrestricted in both directions.

8. The invention of claim 3, characterized by:

each clutch cylinder means in the respective sets of clutch cylinder means comprising an opposing spring means and a companion cylinder, each such spring means and companion cylinder being constructed, proportioned, and arranged relatively to one another and to the clutch concerned to insure that the clutch cylinder means for the set of speed clutches achieve clutch engaging pressure at a pressure lower than for the set of direction clutches and, perforce, the selected ones of the clutch cylinder means operate for engaging a speed clutch before a clutch for forward or reverse direction.

9. The invention of claim 8, in combination with:

the sets of forward and reverse direction and speed range clutches;

the speed clutches being constructed, proportioned in size, and arranged with smaller energy absorbing capacity than either the forward or the reverse direction clutch.

10. In a method of scheduling clutch pressures through signal pressure application in the operation of a power shift transmission having a final line pressure source for providing actuating pressure, sets of direction and speed clutch mechanisms, clutch selector means for said mechanisms, a line pressure intercommunication operatively disposed between the final line pressure source and clutch selector means and controllable to operatively open and supply the mechanisms selected with actuating pressure through the clutch selector means, and accumulator means in which to accumulate the scheduling pressure, the steps comprising:

development of a reduced first signal as a function of the selected speed clutch pressure;

development of a reduced second signal as a function of the selected direction clutch pressure;

application of the first and second signals as a combined back pressure signal to the accumulator so that the latter accumulates accumulator scheduling pressure substantially linearly and proportionately to the first and second signals jointly; and regulation of the opening of the line pressure intercommunication so as to control the pressure therein as a function of the substantially linear rate of rise of scheduling pressure.

11. In the invention of claim 10, the further steps comprising:

engagement of the selected speed clutch mechanism at less than final pressure; and engagement of the selected direction clutch mechanism upon attainment of final pressure in said line pressure intercommunication.

* * * * *